July 25, 1967
C. A. SECKERSON ET AL
3,332,463
RESILIENT NUT AND COLLAR THEREFOR
Filed Jan. 13, 1965
2 Sheets-Sheet 1
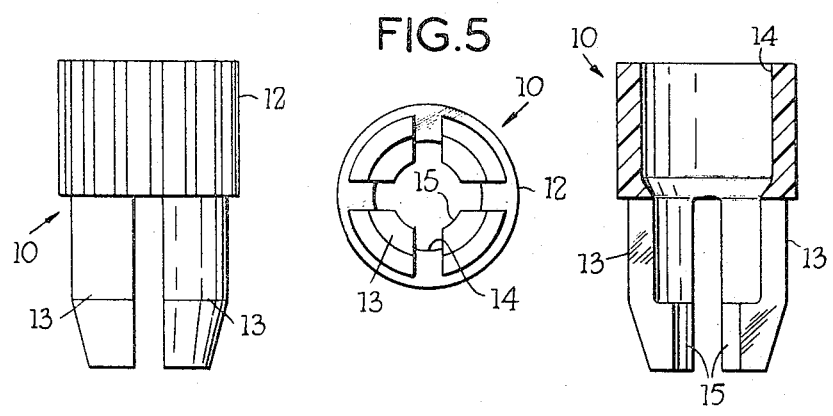
FIG. 1
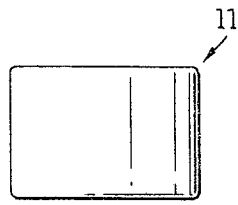
FIG. 2
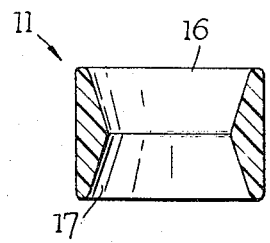
FIG. 4
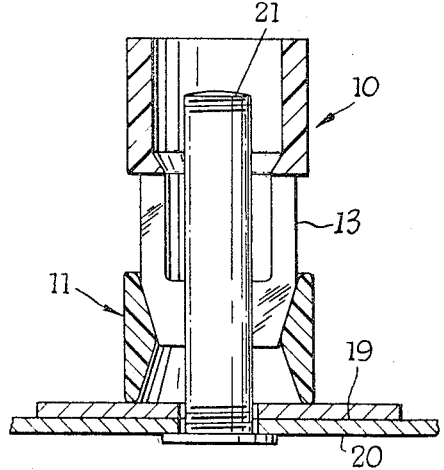
INVENTORS
Clifford Alexander Seckerson
Ernest John Hammer
by. Gadon Needleman
Attorney.

July 25, 1967   C. A. SECKERSON ET AL   3,332,463
RESILIENT NUT AND COLLAR THEREFOR
Filed Jan. 13, 1965   2 Sheets-Sheet 2

INVENTORS
Clifford Alexander Seckerson
Ernest John Hammer
By Gordon Needleman
Attorney.

United States Patent Office 3,332,463
Patented July 25, 1967

3,332,463
RESILIENT NUT AND COLLAR THEREFOR
Clifford Alexander Seckerson, Iver Heath, Buckinghamshire, and Ernest John Hammer, South Norwood, London, England, assignors to United-Carr Incorporated, Boston, Mass., a corporation of Delaware
Filed Jan. 13, 1965, Ser. No. 425,201
Claims priority, application Great Britain, Jan. 16, 1964, 2,026/64
2 Claims. (Cl. 151—19)

The present invention relates to an improved two-part fastener which is particularly suitable for use as a quick feed nut.

According to the present invention there is provided a two-part fastener comprising a nut and a collar therefor having an internal wall, the nut having a head, and depending from the head a plurality of resilient tongues which co-operate to form a longitudinally split tubular shank and the external surface of the shank and the internal wall of the collar being so inclined relative to one another that the tongues of the shank are moved radially inwardly towards one another for clamping engagement on a member projecting therethrough when the shank is inserted through the collar.

According to a further feature of the invention there is provided a two-part fastener comprising a nut and a collar therefor, the nut having a head, and depending from the head, a plurality of resilient tongues which co-operate to form a longitudinally split tubular shank which is externally tapered from the head whereby insertion of the shank into the collar results in radially inward movement of the tongues for clamping engagement on a member projecting therethrough.

Figure 7:
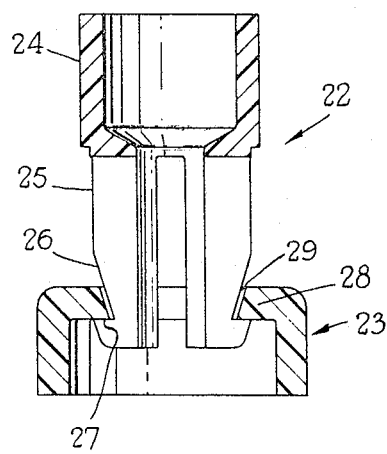
Figure 8:
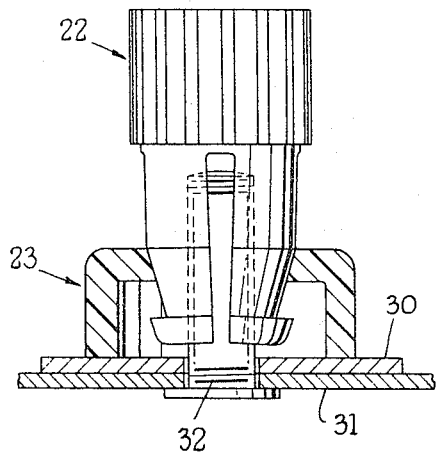

Preferred forms of the invention will now be described with reference to the accompanying diagrammatic drawings in which:

FIGURE 1 is an elevation of a plastics nut,
FIGURE 2 is an elevation of a plastics collar for the use with the nut of FIGURE 1,
FIGURES 3 and 4 are respectively sections on the nut and collar of FIGURES 1 and 2,
FIGURE 5 is an under-plan view of the nut of FIGURE 1,
FIGURE 6 is a section through an assembly of the nut and collar of FIGURES 1 to 5 assembled on a threaded bolt,
FIGURE 7 is a section through a modification of the nut and collar of FIGURES 1 and 2, and
FIGURE 8 is a part sectional elevation showing the nut and collar of FIGURE 7 engaged on a threaded bolt.

In FIGURES 1 and 2 a nut and collar are shown respectively at 10 and 11. Both the nut and collar are formed from a suitable synthetic plastics material and are adapted to co-operate, in the manner shown in FIGURE 6, to form a two part fastener which acts as a quick feed nut.

The nut 10 is generally tubular and comprises a head 12, which is externally knurled or fluted, and four resilient tongues 13 which depend from the under side of the head 12.

The head 12 is formed with a through bore 14 and the depending tongues 13 co-operate to define a longitudinally split tubular shank which has a through bore coaxial and continuous with the bore 14.

Adjacent their free ends, the tongues 13 are tapered externally away from the head and towards the axis of the shank.

Each tongue is formed with a projection 15 which extends into the bore of the shank and the projections have inwardly facing surfaces which are part-cylindrical and co-operate to form a bore for the reception of a threaded member such as a screw or bolt.

The screw engaging surfaces are unthreaded, but it will be appreciated that these surfaces may be provided with screw engaging threads if desired.

The collar 11 is externally cylindrical and tapers internally from both ends to a point intermediate its length so as to form two annular conical internal surfaces 16 and 17.

The nut 10 and collar 11 are adapted for use as shown in FIGURE 6 to secure an apertured member 19 to a support 20 which carries a threaded bolt 21.

In order to make the assembly shown in FIGURE 6, the member 19 is passed over the bolt 21 carried by the support and the collar 11 is then placed over the bolt so as to abut against the member 19 on the side remote from the support. The nut 10 is then pressed over the bolt and the resilient tongues 13 bend outwardly so as to allow the projections 15 to pass easily over the thread on the bolt.

As soon as the externally tapered ends of the tongues enter the collar 11 they are forced radially inwardly by the conical surface 16 of the collar and the inwardly facing screw engaging surfaces of the projections 15 are forced into engagement with the thread of the bolt. When the tongues 13 are in engagement with the bolt the nut 10 is turned and the thread on the bolt cuts or impresses a corresponding thread in the surface 15 thereby locking the nut and collar on the bolt.

It will be appreciated that the tongues 13 may be externally part-cylindrical so that the shank has no taper at its free end, provided that the collar 11 is of such diameter that the free end of the shank can enter the collar and that the taper on the surface 16 is sufficient to cam the tongues 13 inwardly on to the bolt.

Alternatively, the collar 11 may be internally cylindrical and the camming movement of the tongues 13 on to the bolt produced entirely by the external taper on the tongues themselves.

A modification of the nut and collar of FIGURES 1 and 2 is indicated generally at 22 and 23 in FIGURES 7 and 8.

The nut 22 is formed with a head 24 which is similar to the head 12 of the nut 10, and depending from the head 24 are four resilient tongues 25 which together define a longitudinally split tubular shank.

The internal surfaces of the tongues 25 are part cylindrical and externally the tongues are tapered away from the head to form a substantially conical portion 26. At the end of the conical portion 26 the shank is formed with an external shoulder 27 facing the head 24.

The collar 23 is cylindrical and one end is partially closed by an end wall 28.

A tapered aperture 29 is formed in the end wall 28 and the dimensions of the shank of the nut 22 are such that the tongues can be forced together and passed through the aperture 29 and will then spring apart so that the shank cannot subsequently be withdrawn from the collar without again forcing the tongues together.

Thus the nut 22 and collar 23 can be assembled as shown in FIGURE 7 so as to be handled and transported as a single unit.

It will be seen from FIGURE 7 that when the nut and collar are assembled together there is sufficient clearance between the tapered portion 26 of the shank and the aperture 29 for the tongues to flex outwardly when the nut and collar are passed over a bolt.

In order to hold an apertured member 30 to a support 31 carrying a bolt 32, as shown in FIGURE 7, the apertured member is passed over the bolt and the collar and nut are passed down over the shank of the bolt until the collar seats on the apertured member 30.

While the collar is being passed over the shank of the bolt the nut is in the position, relative to the collar, shown in FIGURE 7 so that the tongues can flex outwardly and pass freely over the bolt.

When the collar is in place against the apertured member 30, the nut is pressed down through the tapered aperture 29 in the collar so that the tongues are moved inwardly by the taper into engagement with the threaded bolt. As the nut is turned a thread is cut on the internal surfaces of the tongues 25 by the threaded bolt and thus the nut and collar are locked on the bolt.

It will be appreciated that the aperture of the collar need not be tapered and may be cylindrical provided that the internal diameter of the aperture is such that the tongues are moved inwardly as the tapered portion of the shank is forced into the aperture of the collar.

Instead of the head of the nut having a fluted cylindrical outer surface, the head may be externally of regular polygonal cross section, preferably having four to six sides so as to facilitate gripping and turning the nut.

In the described embodiments both the collar and the nut are made from a synthetic plastics material but, if preferred either the collar or both the collar and the nut may be made of metal provided that, in the latter case the tongues are sufficiently flexible to achieve the necessary radial movement to bite on the bolt.

What we claim is:

1. A two-part fastener comprising a nut and a collar therefor having an internal, annular surface tapering inwardly from one end thereof, the nut having a head and, depending from the head, a plurality of resilient tongues which co-operate to form a longitudinally split tubular shank a portion of which is externally tapered whereby insertion of the shank into the collar results in radially inward movement of the tongues for clamping engagement on a threaded member projecting therethrough, each of said tongues having an internal projection at its free end, co-operating to form a bore for reception of a threaded member, each of said projections having an internal, longitudinally extending uninterrupted threaded member clamping face of a length approximately equal to the length of the internal tapering surface for the cutting of threads in the tongues by a threaded member responsive to a turning of the nut, the internal diameter of the major portion of the nut being appreciably greater than the external diameter of the threaded member.

2. A two-part fastener comprising a nut and a collar therefor, the coller being cylindrical and having one end partially closed by an end wall, the end wall having an inwardly tapering, internal annular wall, the nut having a head and, depending from the head, a plurality of resilient tongues which co-operate to form a longitudinally split, tubular shank which has an external shoulder facing the head at its end remote from the head, and which has an inwardly tapering portion between the head and the shoulder, the inwardly tapering, annular wall of the collar encircling the tapered portion of the shank, and having a minimum internal diameter less than the maximum diameter of the shoulder and of the tapered portion of the shank whereby the collar is retained on the shank and movement of the collar relative to the shank towards the head results in radially inward movement of the tongues for clamping engagement on a threaded member projecting therethrough.

References Cited

UNITED STATES PATENTS

| 1,086,687 | 2/1914 | Newton | 85—32 |
| 2,361,814 | 10/1944 | Berry | 151—19 |
| 2,518,467 | 8/1950 | Harding | 151—19 |
| 2,523,806 | 9/1950 | Bohne. | |
| 3,221,589 | 12/1965 | Vander Sande et al. | 151—19 X |

FOREIGN PATENTS 153,562    6/1932   Switzerland.

WILLIAM FELDMAN, *Primary Examiner.*

E. SIMONSEN, *Assistant Examiner.*